United States Patent [19]

Saito

[11] Patent Number: 4,577,715

[45] Date of Patent: Mar. 25, 1986

[54] POWER ASSIST STEERING GEAR ASSEMBLY

[75] Inventor: Naoki Saito, Maebashi, Japan

[73] Assignee: Nippon Seiko Kabushiki Kaisha, Tokyo, Japan

[21] Appl. No.: 631,071

[22] Filed: Jul. 16, 1984

[30] Foreign Application Priority Data

Jul. 22, 1983 [JP] Japan .................. 58-132828

[51] Int. Cl.$^4$ .................. B62D 5/04; B62D 5/06
[52] U.S. Cl. .................. 180/79.1; 180/143
[58] Field of Search .................. 180/79.1, 141, 142, 180/143

[56] References Cited

U.S. PATENT DOCUMENTS

| 2,380,662 | 7/1945 | Means, Jr. | 74/459 |
| 3,983,953 | 10/1976 | Bayle | 180/79.1 |
| 4,223,254 | 9/1980 | Adams | 180/79.1 |
| 4,415,054 | 11/1983 | Drutchas | 180/79.1 |
| 4,457,390 | 7/1984 | Abe et al. | 180/143 |

FOREIGN PATENT DOCUMENTS

| 55-44013 | 3/1980 | Japan . |
| 55-44058 | 3/1980 | Japan . |
| 57-120164 | 7/1982 | Japan . |

Primary Examiner—John J. Camby
Attorney, Agent, or Firm—Shapiro and Shapiro

[57] ABSTRACT

Power assist steering gear assembly for vehicle comprises an elongated member linearly movable in opposite directions for pivoting of dirigible wheels. The elongated member comprises a rack portion formed at a first axial position and engaged with a pinion connected to a steering shaft and a thread portion formed at a second axial position and cooperating with a ball nut. The power assist steering unit further comprises an electric motor unit coaxially arranged about the elongated member at a third axial position and including an electric motor connected to the ball nut through rotation transmitting means to assist the linear movement of the elongated member.

3 Claims, 3 Drawing Figures

POWER ASSIST STEERING GEAR ASSEMBLY

BACKGROUND OF THE INVENTION

1. Field of the Invention

This invention relates to an electric type power assist steering device for vehicles using an electric motor as a power source to reduce or assist the force for steering the steering wheel of the vehicle.

2. Description of the Prior Art

Steering devices are grouped into the manual type and the power assist type, and in the latter type a power source reduces or assists the steering force. The power assist steering devices are further grouped into the electric type and the hydraulic type.

The electric type power assist steering device, as compared with the hydraulic type power assist steering device, is advantageous in that it does not require an oil pump or the like as a drive source normally directly connected to the engine, and therefore there is no loss of engine horsepower, there is no possibility of leakage, contamination, deterioration or the like of hydraulic operating oil; maintenance is easy because operating oil is not used hydraulic piping is not necessary, only electric wiring being required, promoting ease of assembly; and a highly accurate and delicate device such as a hydraulic control valve is not necessary and therefore an inexpensive system is possible.

SUMMARY OF THE INVENTION

It is an object of the present invention to provide an electric type power assist steering device which can be readily incorporated into a limited space within an automotive vehicle.

It is a further object of the present invention to provide an electric type power assist steering device in which a power assisting electric motor portion and a movement converting mechanism portion for converting rotational movement into rectilinear movement for accomplishing the steering are made into units, respectively, and can be easily assembled.

The invention will become fully apparent from the following detailed description thereof taken in conjunction with the accompanying drawings.

DESCRIPTION OF THE PREFERRED EMBODIMENT

An embodiment of the present invention will hereinafter be described in detail by reference to the drawings.

Figure 1:
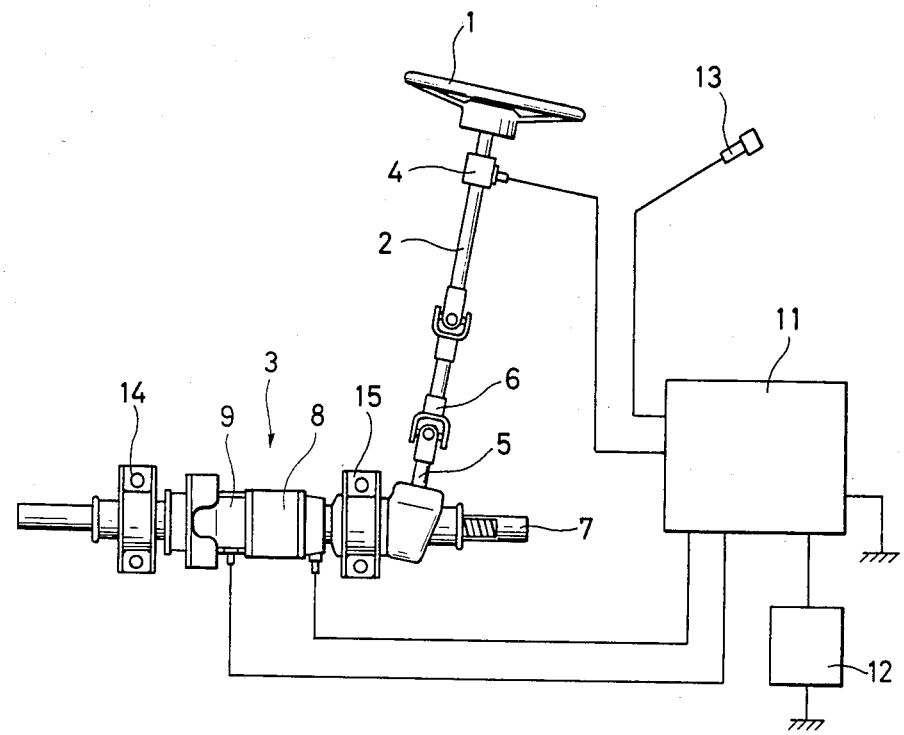
FIG. 1 shows the system of an embodiment of the electric type power assist steering device according to the present invention.

Referring to FIG. 1 which shows a steering device for automotive vehicle provided with an electric type power assist steering mechanism according to the present invention, reference numeral 1 designates a steering wheel and reference numeral 2 denotes a steering shaft to which the steering wheel is secured. The steering shaft 2 is connected to a pinion shaft 5 through a universal joint 6. The pinion shaft 5 has a pinion gear 16 (see FIG. 2) at the end thereof, and the pinion gear 16 is in mesh engagement with a rack 17 formed in an elongated power transmitting member 7 provided for movement to the left and right on a steering device body portion 3 which will later be described.

A power assisting motor unit 8 is provided on the steering device body portion 3 which is a movement converting mechanism for converting the rotational input for steering into a rectilinear movement for pivoting of the dirigible wheels of the vehicle. The rotational output from the motor unit 8 drives the power transmitting member 7 through rotation transmitting means including electromagnetic clutch means 9, and the rotation transmitting means from the motor unit to the power transmitting member 7 wil later be described in detail.

The steering shaft 2 is provided with a torque detector 4 for detecting the torque applied to the steering wheel, and the output of the torque detector 4 is connected to a control circuit 11. The control circuit 11 in turn may be connected to another input source such as a vehicle speed detector 13 as required. Designated by 12 is an electric power source. The control circuit 11 is connected to the electric motor unit 8 and the electromagnetic clutch 9 and control the electric motor unit 8 and the electromagnetic clutch 9 on the basis of the torque applied to the steering shaft and/or information such as vehicle speed, but this control circuit is not directly related to the present invention and therefore need not be described in detail. Generally, the body 3 is fixed to the vehicle by brackets 14 and 15. Ball joints (not shown) are mounted on the opposite ends of the power transmitting member 7 and are connected to the respective dirigible wheel (not shown) through knuckle arms or the like in a known manner.

Figure 2:
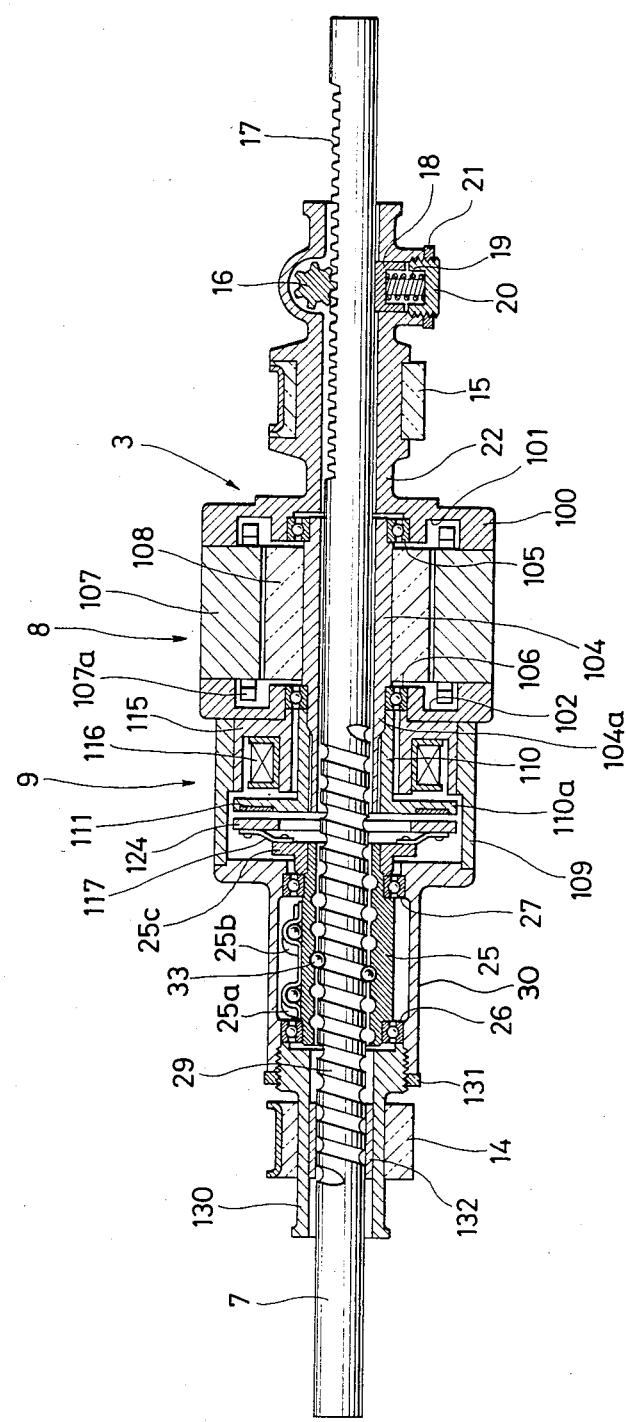
FIG. 2 is a cross-sectional view of the essential portions of a first embodiment of the invention.

Reference is now had particularly to FIG. 2 to describe the electric type power assist steering mechanism which is an embodiment of the present invention.

As previously described, reference numeral 16 designates the pinion gear formed on the pinion shaft 5 and reference numeral 17 denotes the rack gear having rectilinear teeth formed on the power transmitting member 7. Reference numeral 18 designates a pressure pad subjected to the load in the radial direction of the power transmitting member 7, i.e., the direction perpendicular to the lengthwise direction, reference numeral 19 denotes a spring for imparting a meshing pre-pressure to the helical pinion gear 16 and the rack gear 17 through the pad 18, reference numeral 20 designates a lid member for enabling the meshing pre-pressure to be adjusted, reference numeral 21 denotes a locking nut for fixing the lid member 20, and reference numeral 22 designates a housing member.

A worm 29 is formed at another location on the power transmitting member 7, and a ball nut 25 is provided which surrounds a part of the worm 29. In the case of the present embodiment, the ball nut 25 is provided with two ball circulation paths 25a and 25b, and a number of balls 33 (only one of which is designated in FIG. 2) in these circulation paths 25a and 25b and between the ball nut 25 and the worm groove corresponding thereto and thus, the worm 29, the ball nut 25 and the balls 33 together constitute ball screw and nut means known per se as is disclosed in U.S. Pat. No. 2,380,662.

The ball nut 25 has its opposite ends rotatably supported on a housing 30 by ball bearings 26 and 27. Reference numeral 130 designates a lid member for imparting a pre-pressure to the bearings 26 and 27, reference numeral 131 denotes a lock nut for adjusting the lid member 130, and reference numeral 132 designates a rack bushing subjected to the load in the radial direction of the power transmitting member 7.

The motor unit 8 has a housing comprising a cylindrical housing body 100 and opposite side members 101 and 102 secured thereto. In the present embodiment, the right side member 101 is formed integrally with the housing 22 of rack and pinion gear means, but alternatively the former may be separate from the latter.

A stator 107 is provided on the inner peripheral portion of the housing member 100. A rotary shaft 104 is rotatably but axially immovably supported at the central portions of the opposite side members 101 and 102 by bearings 105 and 106. A rotor 108 is secured to the rotary shaft 104 in radially facing relationship with the motor stator 107. An electromagnetic coil 107a is provided on the motor stator and is supplied with electric power from the control circuit 11 shown in FIG. 1, but the construction of the motor itself is conventional and therefore need not be described in detail herein.

The rotary shaft 104 of the motor is in the form of a hollow cylinder and the power transmitting member 7 extends through the interior thereof. Thus, the motor structure comprising the housings 100, 101, 102, the stator 107, the rotor 108 and the rotary shaft 104 is arranged coaxially with the power transmitting member 7. The rotary shaft 104 of the motor has a portion 104a extending through the housing side member 102 and projecting into a clutch housing 109 which will later be described.

The clutch housing 109 is a cylindrical member secured at one end thereof to the motor housing side plate 102 and at the other end thereof to the housing 30 of the ball screw and nut means.

A cylindrical member 110 is secured to the portion 104a of the rotary shaft 104 of the motor which projects into the clutch housing, and a friction disc 110a is radially formed integrally with the end portion of the cylindrical member 110. The friction disc 110a is provided with a friction lining 111.

A support ring 115 is secured to a portion of the inner peripheral surface of the clutch housing 109 which is adjacent to the motor. An annular electromagnetic coil 116 is disposed on the support ring 115. The electromagnetic coil 116 is connected to the control circuit 11 (FIG. 1) and is ON-OFF-controlled by the control circuit 11.

A flange member 25c secured to the nut member 25 of the aforementioned ball screw and nut means is within the clutch housing 109. A rotation transmitted friction disc or plate 124 is secured to the flange member 25c through a radially outwardly extending plate spring 117. The friction disc 124 is formed of a magnetic material and has a surface opposed to the friction lining 111 of the aforementioned friction disc 110a, and is normally biased to the left as viewed in FIG. 2 by the action of the plate spring 117. The friction disc 124 is normally out of engagement with the friction disc 110a, but when the electromagnetic coil 116 is energized, the friction disc 124 is attracted to the electromagnetic coil 116 rightwardly as viewed in FIG. 2 and as a result, the friction disc 124 comes into frictional engagement with the friction disc 110a to thereby become capable of transmitting the rotation output of the motor to the nut 25.

In the above-described construction, the rack gear 17 of the rack and pinion gear means and the worm 29 of the ball screw and nut means are formed at different locations on the power transmitting member 7. The pinion gear 16 is in mesh engagement with the rack gear 17 to convert the rotation of the steering wheel 1 into a linear movement of the power transmitting member 7 and also cooperates with the pressure pad 18 to prevent the power transmitting member 7 from rotating about the lengthwise center axis thereof. On the other hand, the nut 25 of the ball screw and nut means is supported by the bearings 26 and 27 through the balls 33 so as to be rotatable relative to the housing member 30 and is combined with the worm 29. The friction plate 124 is mounted on the flange member 25c secured to the nut 25, through the plate spring 117 and, when the electromagnetic coil 116 is ON or energized, this friction plate 124 meshes with the friction disc 110a against the force of the plate spring 117, and thereby the output shaft 104 of the electric motor spline-coupled to the tubular portion 110 which is integral with the friction disc 110a is drivingly connected to the nut 25. When the coil 116 is OFF or deenergized, the friction plate 124 is pulled toward the nut 25 by the plate spring 117 and the two friction discs 110a and 124 are separated from each other and thus, the output of the electric motor unit 8 is not transmitted to the nut 25. When the output of the electric motor unit 8 is transmitted, the ball screw and nut means converts the rotational output of the motor unit into an axial or linear movement of the power transmitting member 7 in the right or left direction and at this time, the power transmitting member 7 receives a reaction forces which tends to rotate it, but the power transmitting member 7 is designed such that it is not rotated by virtue of the reaction forces of the mesh engagement between the pinion gear 16 and the rack gear 17 and the pressure pad 18 is previously described.

The control circuit 11 receives as inputs from the torque detector 4 and the vehicle speed detector 13 electrical signals corresponding to the steering shaft torque and vehicle speed, respectively, and processes these signals in a predetermined manner and puts out control signals to the electric motor unit 8 and the electromagnetic clutch 9. Thus, by suitably engaging or disengaging the electromagnetic clutch 9, the electric motor unit 8 is controlled so that change-over between manual steering and power steering is effected or a suitable output is obtained in conformity with the torque and vehicle speed detected during power assist steering.

For example, during low speed running when the steering force is heaviest, the clutch 9 may be engaged to control the electric motor unit 8 so that an output corresponding to the detected torque may be obtained, and the steering force applied to the steering wheel 1 may be reduced by an amount corresponding to such output, or when the steering force is light and a more direct steering sense is required as during high speed running, the electromagnetic clutch 9 may be disengaged and manual steering may be adopted and further, during power assist steering, the output of the electric motor unit 8 may be controlled with the vehicle speed and the angle of steering taken into account.

Also, to secure fail-safe operation, it is necessary to disengage the electromagnetic clutch 9 by the control circuit 11 so that manual steering may be adopted whenever abnormality occurs.

Operation will hereinafter be described.

When the electromagnetic clutch 9 is disengaged, or not in its operative condition, the output shaft 104 of the electric motor unit 8 and the nut 25 are operatively separated from each other. When the steering wheel 1 is operated in this condition, the rotation thereof is converted into axial or rectilinear movement of the power transmitting member 7 by the mesh engagement between the pinion gear 16 and the rack gear 17 and determines the direction of each of the dirigible wheels through a ball joint and a knuckle arm, not shown. This operation is the same as the operation of the popular manually operated rack and pinion type steering device.

When the electromagnetic clutch 9 is engaged, or in its operative condition, the output shaft 104 of the electric motor unit 8 and the nut 25 are coupled together. When the steering wheel 1 is operated in this condition, the steering shaft torque corresponding to the load which the power transmitting member 7 receives from the outside is detected by the torque detector 4 and is transmitted to the control circuit 11, and the vehicle speed is also transmitted from the vehicle speed detector 13 to the control circuit 11. As previously described, on the basis of these signals, the output of the electric motor unit 8 is controlled with a predetermined characteristic, and this output is transmitted to the power transmitting member 7 through the ball screw and nut means 25, 33, and worn 29 at high efficiency and reduction gear ratio.

Figure 3:
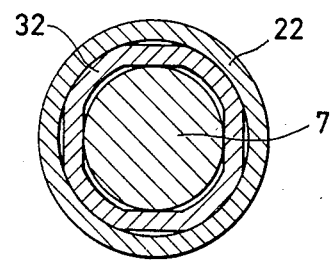
FIG. 3 is a cross-sectional view of the rack bushing portion of the same embodiment of the invention.

FIG. 3 exaggeratingly illustrates an example of the bushing 32 which receives the load in the radial direction of the power transmitting member 7 used in this electric type power assist steering device. The radial load on the ball screw and nut means side of the power transmitting member 7 is basically received by the bearings 26 and 27 through the ball screw and nut means, but as a countermeasure for running on a bad road, it is desirable that the bushing 32 as shown in FIG. 3 be formed by the use of an elastic material such as resin, and in a small range of radial load that the elastic deformability of the bushing be set to a great value so that almost all of the load is received by the bearings 26 and 27 through the ball screw and nut means and the bushing 32 be designed to contact the housing 22 and directly receive a radial load exceeding a predetermined value when the load exceeds a certain set value and the amount of deformation of the ball screw and nut means and the bearings 26, 27 is increased. In addition to the above-described effect, this rack bushing 32 contacts the power transmitting member 7 only at several points in the normal range of steering in which the radial load is small, by being combined with the ball screw and nut means and therefore, the friction resulting from the axial or rectilinear movement of the power transmitting member 7 by the ball screw and nut means is small and thus, light steering is possible, and when a great radial load acts from the outside, the bushing 32 is deformed and the surface pressure of the surface which is in contact with the power transmitting member 7 is increased, whereby the friction is increased to prevent kick back and improve the steering sense.

A gear type speed reduction device or the like is not used between the electric motor unit 8 and the nut 25, and this leads to a simple structure of high efficiency (low friction loss) and low noise, which in turn leads to compactness and light weight of the device.

Now, in the above-described embodiment, the torque detector 4 may be any conventional one using a strain gauge or magnetic strain and may be installed on the pinion shaft 5. Also, the above-described embodiment adopts a form in which the opposite ends of the power transmitting member 7 which is the output shaft means are connected to the respective dirigible wheels through a ball joint, a knuckle arm, etc., but the present invention is also applicable to the so-called center take-off type in which the central portion of the output shaft means is connected to the dirigible wheels.

According to the present invention, as described above, a ball screw and nut means type actuator is combined with the rack and pinion gear type steering device and this eliminates the necessity of separately providing a mechanism for preventing rotation of the worm 29 formed on the power transmitting member 7 which is indispensable to a ball screw and nut means type direct-acting actuator. The output of the power assisting electric motor is transmitted through the ball screw and nut means, and this leads to a simple, compact structure of high efficiency having an effect similar to that obtained when a reduction gear is employed and thus, it is generally made realistic from the viewpoints of space, efficiency, etc. to use an electric motor having characteristics such as high speed and low torque in a power assist steering device.

According to the present invention, the ball screw and nut means, the dirigible device portion including the rack and pinion gear means, and the power assisting means using the motor are made into units, respectively, and therefore there can be provided an electric type power assist steering device which is easy to assemble.

Further, according to the present invention, there is provided an electric type power assist steering device in which the influence of magnetism and heating of the power assisting electric motor portion is not imparted to the ball screw and nut means.

Furthermore, according to the present invention, there is provided an electric type steering device in which when the assisting power from the motor is interrupted, the connection between the motor and the converting mechanism is completely shut off to thereby minimize the steering wheel torque and ensure good return of the steering wheel.

I claim:

1. Power assist steering assembly for vehicles comprising:
rotary shaft means connected to a steering wheel to be rotated in unison therewith;
an elongated member linearly movable in opposite directions for pivoting of dirigible wheels;
rack and pinion gear means for drivingly connecting the rotary shaft means and the elongated member, the gear means including a pinion gear rotatable in unison with the rotary shaft means and a rack gear provided on the elongated member at a first axial position and disposed in meshing engagement with the pinion gear;
ball screw and nut means including thread means provided on the elongated member at a second axial position, rotatable nut means circumscribing at least a portion of said thread means and ball means for transmitting force between said nut means and said thread means;
an electric motor disposed at a third axial position axially between the first and second positions and including a stator, a rotor and a rotation output member connected to the rotor, the stator, rotor and rotation output member being coaxially arranged around the elongated member;
rotation transmitting means from the motor to the nut means of the ball screw and nut means, the rotation transmitting means including electromagnetic clutch means disposed at a fourth axial position axially between the rotation output member of the motor and said nut means of the ball screw and nut screws, said electromagnetic clutch means being controlled independently of the motor and including a pair of radially extending clutch faces connected to said rotation output member and said nut means respectively and coil means for controlling the clutch faces electromagnetically so that when the clutch faces are brought into frictional contact with each other rotation of the motor is transmitted to the nut means and when the clutch faces are spaced apart from each other the nut means is completely released from the motor;

means for detecting torque applied to the steering wheel; and means for controlling the motor and the electromagnetic clutch means in response to detection of torque by the torque detecting means.

2. Power assist steering assembly for vehicles comprising:

rotary shaft means directly driven by a steering wheel;

an elongated member linearly movable in opposite directions for pivoting of dirigible wheels;

a first unit including a first housing fixed to a vehicle body in which are encased a first axial portion of the elongated member, a rack formed on the first axial portion of the elongated member, and a pinion gear engaged with the rack and connected to the rotary shaft means;

a second unit including a second housing which is connected to the first housing and in which are encased a second axial portion of the elongated member and ball screw and nut means, the ball screw and nut means including thread means formed on the second axial portion of the elongated member, nut means circumscribing at least a portion of the thread means and anti-friction force transmitting means disposed between the thread means and the nut means;

a third unit including a third housing in which is encased a third axial portion of the elongated member and an electric motor disposed coaxially with and about the third axial portion of the elongated member, the motor including a stator, a rotor, and a rotation output shaft connected to the rotor;

a fourth unit including a fourth housing which is disposed between and connected to the second and third housings and in which is encased rotation transmitting means for transmitting rotation from the rotation output shaft of the motor to the nut means of said first unit, the rotation transmitting means including an electromagnetic clutch means for connecting the rotation output shaft of the motor and said nut means of the ball screw and nut means to transmit rotation from the motor to the nut means;

means for detecting torque applied to the rotary shaft means; and control means for controlling the motor in response to the torque detecting means.

3. Power assist steering assembly according to claim 2, wherein said electromagnetic clutch means includes a ring-shaped magnetic disc which is coaxially arranged about the elongated member and which is axially movable relative to and rotatable in unison with the nut means, a ring-shaped friction disc arranged coaxially about the elongated member to oppose axially the magnetic disc and fixed to the rotation output member of the motor, and a coil for electromagnetically controlling axial movement of the magnetic disc.

* * * * *